(No Model.)

J. McC. PALMER.
TONGS FOR TURNING PIPES.

No. 561,274. Patented June 2, 1896.

Witnesses:

Inventor
J. M. Palmer.
By James J. Sheehy
Attorney

UNITED STATES PATENT OFFICE.

JOHN McCARTHY PALMER, OF MARYSVILLE, MONTANA.

TONGS FOR TURNING PIPES.

SPECIFICATION forming part of Letters Patent No. 561,274, dated June 2, 1896.

Application filed October 21, 1895. Serial No. 566,409. (No model.)

*To all whom it may concern:*

Be it known that I, JOHN MCCARTHY PALMER, a citizen of the United States, residing at Marysville, in the county of Lewis and Clarke and State of Montana, have invented certain new and useful Improvements in Tongs for Turning Pipes; and I do declare the following to be a full, clear, and exact description of the invention, such as will enable others skilled in the art to which it appertains to make and use the same.

My invention relates to improvements in tongs for turning pipes, nuts, and the like; and it has for its general object to provide a pair of tongs embodying such a construction that one member may be adjusted longitudinally with respect to the other and adjustably fixed so as to adapt the tongs to grip and turn pipes, nuts, and other articles of various sizes.

Another object of the invention is to provide a pair of adjustable tongs in which the parts are so constructed and arranged as to enable them to hold pipes, nuts, and the like in such a manner that the strain will be direct or in the direction of the length of the tongs.

Other objects and advantages of the invention will be fully understood from the following description and claims, when taken in connection with the annexed drawings, in which—

Figure 1:
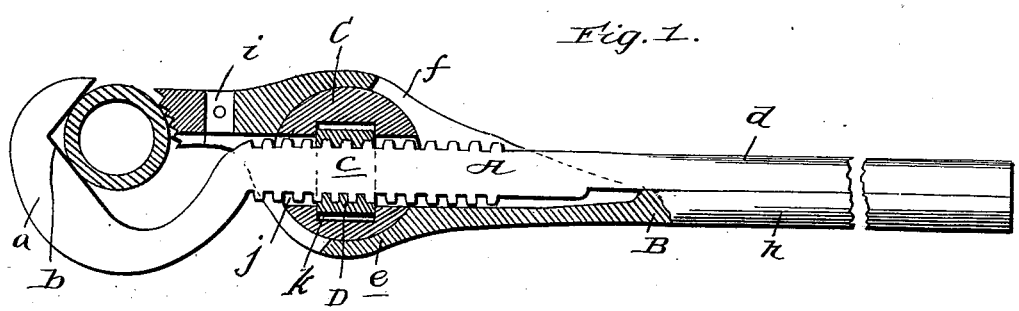
Figure 2:
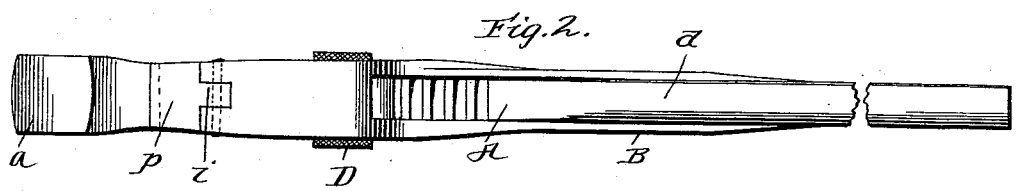
Figure 3:
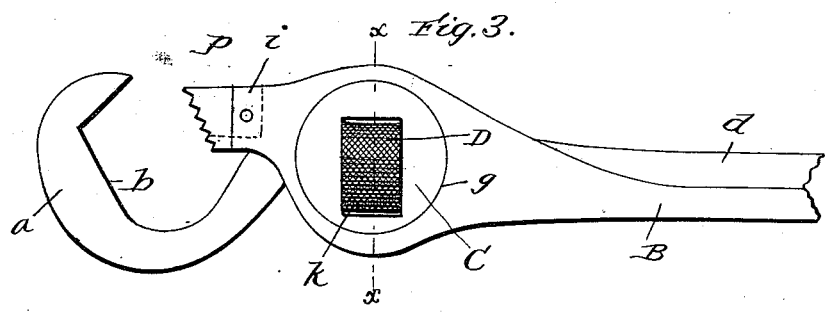
Figure 4:
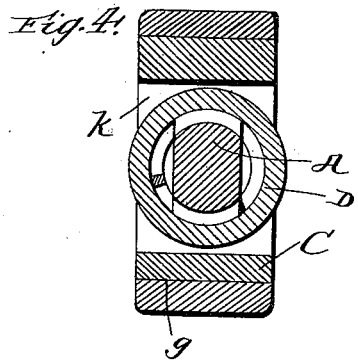

Figure 1 is a longitudinal section of my improved tongs with parts in elevation. Fig. 2 is a plan view. Fig. 3 is a detail side elevation, and Fig. 4 is an enlarged transverse section taken in the plane indicated by the line *x x* of Fig. 3.

In the said drawings similar letters designate corresponding parts in all of the views, referring to which—

A indicates the longitudinally-adjustable member of my improved tongs which is subjected to the greater portion of the strain, and is therefore preferably formed of cast-steel or other suitable material. This member A at its forward end has the hook-jaw *a*, the inner face *b* of which is made angular, as shown, so as to enable it to hold pipes and nuts of various sizes in such a position that when they are gripped the strain will be direct or in the direction of the length of the tongs, and in rear of said hook-jaw the member A is provided with the threaded shank *c* and terminates in the handle portion *d*, which is preferably of a convex-plano form in cross-section, as shown, for a purpose presently described.

B indicates the other member of my improved tongs, which for convenience of description I will term the "fixed" member, as the member A is adjusted longitudinally with respect to it. This fixed member B is subjected in practice to but little strain, and it may therefore be formed of malleable iron, steel, or other material suitable to the purpose. The said member B has its forward portion enlarged, as indicated by *e*, and in said enlarged portion it is provided with the longitudinally-disposed opening *f* for the reception and play of the member A and the transversely-disposed circular opening *g* for the reception of the circular disk C, presently to be described. At one end of the enlarged portion *e* the member B terminates in the handle portion *h*, which, like the handle portion *d* of the member A, is of a convex-plano form in cross-section, so as to permit of said handle portions coming together, as shown in Fig. 1, and affording a convenient and easy hand-grasp, and at the opposite or forward end of the enlarged portion *e* the member B terminates in the jaw *i*, which may be dentated or roughened in any manner, but is preferably provided with a removable and renewable dentated portion *p*, of tool-steel or other suitable material.

The circular disk C, which, as stated, occupies the transversely-disposed opening *g* of the member B, is provided with a longitudinally-disposed opening *j* for the reception and passage of the shank *c* of member A, and is also provided with the transversely-disposed opening *k* for the reception of the interiorly-threaded nut D, which receives and engages the threads of the member A, and is designed to adjust and adjustably fix the same with respect to the member B, as will be more fully hereinafter described. This nut D, and also the opening *k* in circular disk C, have their common center arranged below the center of said circular disk C, and, as will be readily observed, this makes the strain direct and places it against the upper part of the nut, so that the tendency of the handle portions is to come together and the grip is made easy and sure.

It will be readily observed from the foregoing that by turning the nut D and adjusting the member A longitudinally with respect to the member B the tongs may be readily adapted for gripping and turning pipes, nuts, and other articles of various sizes, and it will also be observed that by the provision of the hook-jaw A, having the angular face b, the apex of which is arranged in alinement with the longitudinal center of the wrench, all articles of sizes within the capacity of the wrench will be held in such a position that their centers will rest in alinement with the longitudinal center of the wrench, so as to permit of their being securely gripped.

It will be further appreciated from the foregoing that I effect a pivotal connection of the members A B without using a pivot-jaw.

It will be still further appreciated that the strain on the hook-jaw is placed upon the nut D, and by it transferred to the disk C, and by said disk imposed upon the enlarged portion e of the member B, thus rendering the nut D merely a holding device to retain the hook-jaw of member A in its adjusted position and removing the strain to the enlarged portion of the member B.

With all of its advantages it will be observed that my improved tongs may be manufactured at a cost but little in advance of the cost of ordinary tongs, and that they are strong and durable and are capable of taking the place and performing the functions of several pairs of ordinary tongs of different sizes.

I have in some respects specifically described the construction and relative arrangement of the parts of my improved tongs in order to impart a full, clear, and exact understanding of the same; but I do not desire to be understood as confining myself to such construction and arrangement, as such changes or modifications may be made in practice as fairly fall within the scope of my invention.

Having described my invention, what I claim is—

1. A pair of tongs comprising a member having a jaw at its forward end and a threaded shank terminating in a handle portion, a second member having a jaw at its forward end and a portion provided with a longitudinally-disposed opening adapted to receive the shank of the other member and a transversely-disposed, circular opening, and also having a handle portion, a circular disk arranged and adapted to turn in the transverse opening of said second member and having the longitudinally-disposed opening receiving the shank of the first-named member and also having a transverse opening, and an interiorly-threaded nut arranged in said transverse opening of the disk and receiving and engaging the threaded shank of the first-named member, substantially as and for the purpose specified.

2. A pair of tongs comprising a member having a hook-jaw at its forward end; the inner face b, of which is of an angular form, and also having a threaded shank terminating in a handle portion, a second member having a jaw at its forward end and an enlarged portion provided with a longitudinally-disposed opening adapted to receive the shank of the other member, and a transversely-disposed, circular opening and also having a handle portion, a circular disk arranged and adapted to turn in the transverse opening of said second member and having a longitudinally-disposed opening receiving the shank of the first-named member and a transverse opening, and also having its center arranged in line with the apex of the angular face of the hook-jaw and the longitudinal center of the wrench, and an interiorly-threaded nut arranged in said transverse opening of the disk and receiving and engaging the threaded shank of the first-named member, substantially as and for the purpose set forth.

3. A pair of tongs comprising a member A, having the hook-jaw a, at its forward end, the inner engaging face of which is angular and also having a threaded shank terminating in a handle portion, a member B, having a jaw at its forward end and an enlarged portion provided with a longitudinally-disposed opening receiving the shank of member A, and a transversely-disposed, circular opening and also having a handle portion, a circular disk arranged and adapted to turn in the transverse opening of the member B, and having a longitudinally-disposed opening receiving the shank of the first-named member and also having a transverse opening, the center of which is below the center of the disk, and an interiorly-threaded nut arranged in said transverse opening of the disk and receiving and engaging the threaded shank of the first-named member and having its center also arranged below that of the disk, all substantially as and for the purpose set forth.

In testimony whereof I affix my signature in presence of two witnesses.

JOHN McCARTHY PALMER.

Witnesses:
WILLIAM BARCLAY,
FRED POTTING.